United States Patent
Kintz

[11] Patent Number: 6,065,868
[45] Date of Patent: May 23, 2000

[54] TEMPERATURE DISPLAY FOR A CAR STEREO

[76] Inventor: Erick Paul Kintz, 516 Georgetown Ave., San Mateo, Calif. 94402-2254

[21] Appl. No.: 08/863,708

[22] Filed: May 27, 1997

Related U.S. Application Data

[60] Provisional application No. 60/030,250, Oct. 31, 1996.

[51] Int. Cl.[7] .................................................. G01K 1/00
[52] U.S. Cl. ........................................... 374/141; 374/179
[58] Field of Search ..................... 374/141, 179

[56] References Cited

U.S. PATENT DOCUMENTS

| | | | |
|---|---|---|---|
| 4,503,563 | 3/1985 | Johnson | 374/208 |
| 5,416,728 | 5/1995 | Rudzewicz et al. | 374/142 |

FOREIGN PATENT DOCUMENTS

| | | | |
|---|---|---|---|
| 355056718 | 4/1980 | Japan | 374/141 |
| 405187924 | 7/1993 | Japan | 374/141 |

*Primary Examiner*—Diego F. F. Gutierrez
*Assistant Examiner*—Andrew Hirshfeld

[57] ABSTRACT

This invention involves the addition of a feature to a car stereo which will allow the display of outside air temperature on the stereo's LCD/LED. A thermocouple probe is mounted on the car's exterior in any of several possible locations (such as the radio antenna) and its output is transmitted to an input jack on the stereo. The car stereo is modified to interpret the signal from the probe and display the corresponding outside air temperature in either Centigrade or Fahrenheit degrees as desired.

2 Claims, 3 Drawing Sheets

Exploded View

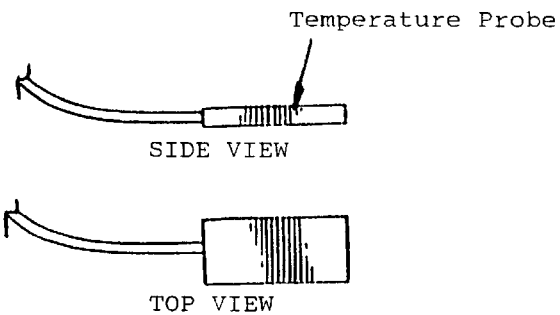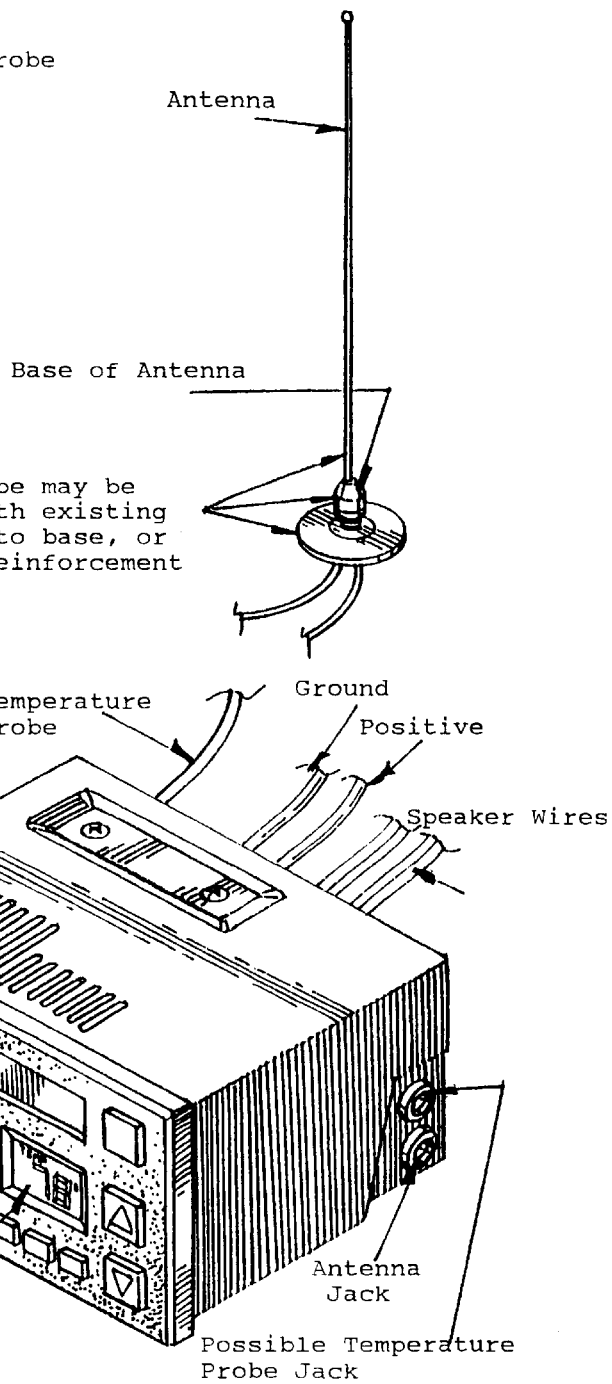

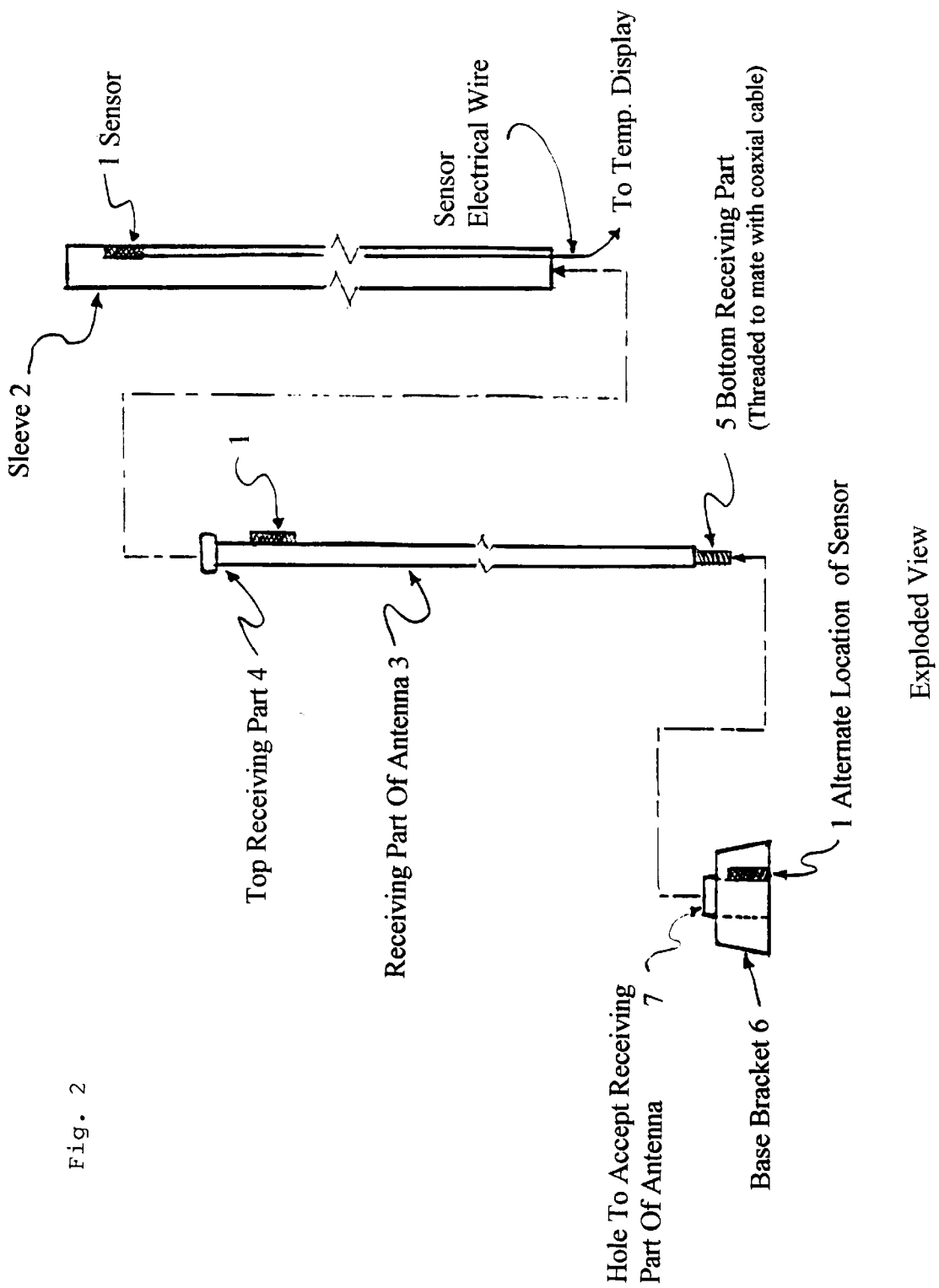

TEMPERATURE DISPLAY FOR A CAR STEREO

This application claims priority from Provisional Application number 60/030,250, filed Oct. 31, 1996.

BACKGROUND OF THE INVENTION

The present invention is based on providing a temperature display for a car stereo. This invention concerns the addition of a feature to automobile audio systems which will allow the outside air temperature to be shown on these systems' Integrated LCD/LED (liquid crystal display/light emitting diode) displays. This feature will allow the selection of the temperature to be shown on the audio system display in the same manner as for example, the time of day is now included on many automobile audio systems. This feature can be activated either by means of a switch on the front control panel or periodically such as for five seconds each minute.

RELATED ART

Related patents that have been approved within my patent search range: U.S. Pat. No. 5,145,137 ANGLE ADJUSTING APPARATUS OF AN LCD FOR A CAR STEREO; U.S. Pat. No. 5,255,162 LIGHTING DEVICE FOR A GRILLE OF A CAR STEREO, and U.S. Pat. No. 5,363,122 SYSTEM FOR CONTROLLING A DISPLAY ON A CAR STEREO.

My present disclosure document program was filed Jan. 18, 1996, file no. 391307. Provisional application filed Oct. 31, 1996, application Ser. No. 60/030,250. Foreign filing licensed granted Dec. 12, 1996 *small entity* TEMPERATURE CONTROL FOR CAR STEREO or TEMPERATURE DISPLAY BUTTON FOR CAR STEREO.

SUMMARY OF THE INVENTION

Temperature display for car stereo is a unique add-on feature for a car stereo. It monitors the outside temperature and displays it on the car stereo's display screen at the touch of a button. It provides a convenient way to determine how hot, warm or cold the weather is outside the car. The ideal reason for having the temperature for car stereo is to give the consumer the advantage of reading the outside temperature instead of waiting for temperature reports on the radio. The primary location of the sensor would be incorporated into the antenna, but other locations on the car are not ruled out. A ram-air effect can produce changes in the temperature reading from minor to a considerable amount depending on the elements of rain, sun, overcast and shaded areas. Additional reasons and purposes for having a temperature display for car stereo pertain to the fact that climates and geography can vary immensely and temperature can change a great deal which gives users the advantage of knowing what the temperature is in their area.

BRIEF DESCRIPTION OF DRAWINGS

FIG. 1 shows temperature and radio display with an optional temperature probe jack.

FIG. 2 is an exploded view of an antenna and temperature sensors of the invention.

FIG. 3 shows one example of a thermocouple or temperature probe jack.

FIG. 4 shows the integrated antenna with the temperature probe.

DETAILED DESCRIPTION OF THE PREFERRED EMBODIMENTS

Figure 5:
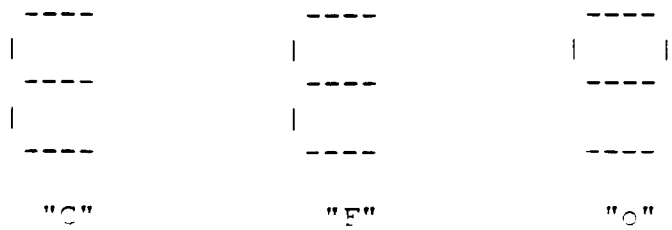
FIG. 5 shows the seven-segment output format.

FIG. 1, shows the actual car stereo with standard 7"×8"×2.5" dimensions as a whole. FIG. 1, also depicts the temperature display button, the LCD or LED display where the actual temperature, radio, clock and other commands and options would be displayed. FIG. 1, also shows where the antenna jack goes and also a possible temperature probe jack with a standard adapter plug of either 13/32", 1/8", 1/4", etc. , etc., . . .

FIG. 3, shows only one form of a thermocouple probe which can be shaped or modified to any form to meet the applications requirements. Most readily available thermocouple conductors or sensors are usually made of dissimilar metals such as chromel/alumel, iron/constantan, copper/constantan, chromel/constantan, depending on the degree of the temperature it needs to transmit: e.g., −40 deg. to 140 deg. or 150 deg. to 250 deg. This is also known as resistance temperature detector ( RTD ). These thermocouples are only a few examples of readily available thermocouples on the market and there are others that exist and can be used.

FIG. 4, shows an actual antenna which is the ideal location for the probe to be attached to. The probe can be attached or modified into the antenna metal, aluminum or the sleeve, as well as the mounting base or bracket. There are also two additional wires coming from the bottom of the antenna: one leads to the deck for radio reception or transmission and the other connects to the temperature probe jack which also ties into the audio system's display circuitry.

In FIG. 2, there is shown possible alternative locations of the temperature sensor 1. One location is between a sleeve 2 of the antenna and a signal receiving portion 3 of the antenna. The sleeve is a conventional protection device utilized for shielding the signal receiving portion 3 from ambient conditions. The sleeve covers the signal receiving portion 3 from its top 4 to at least an area adjacent to its bottom 5. The second location is within the mounting base 6 of the antenna, within the hole 7 that receives the antenna. In this location, the sensor 1 is positioned between the mounting base 6 and the signal receiving portion 3. The sensor 1 is shielded from the elements whether it is positioned within the sleeve 2 or within the base 6.

The temperature sensor 1 is connected to the display of an automobile radio so that outputs corresponding to both the radio signal and the ambient temperature signal (as sensed by the sensor 1) can be displayed, such as by means of a selection switch or the like.

FIG. 5, shows a 7-segment output format.

Figure 6:
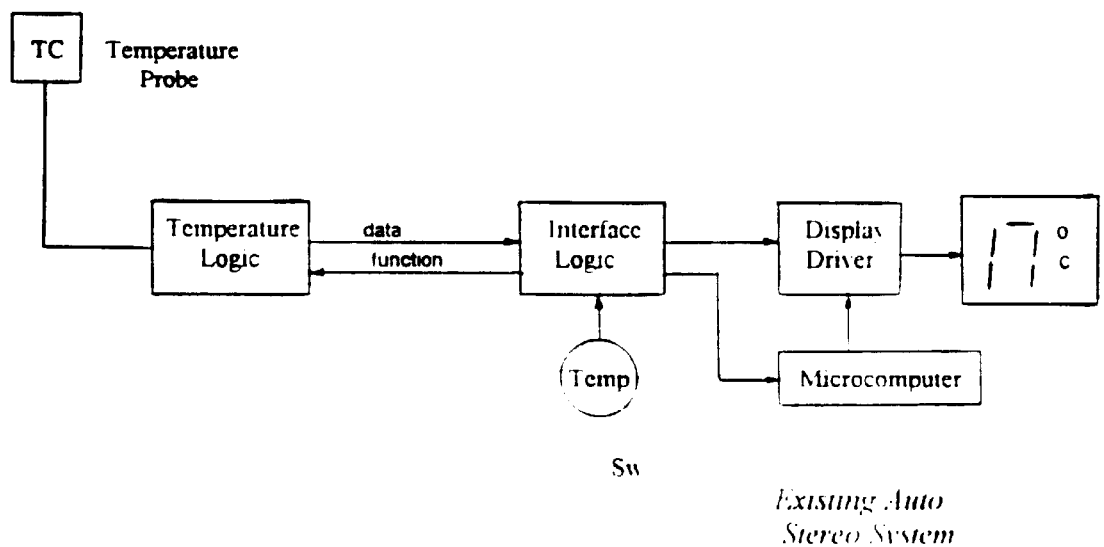
FIG. 6 shows a shematic block diagram of the overall description of the invention.

FIG. 6, shows a schematic block diagram of the overall description of the invention.

This invention concerns the addition of a feature to car stereo systems which will show the outside air temperature on these systems' integrated LCD/LED (Liquid Crystal Display / Light Emitting Diode) displays. This feature will allow selection of the temperature to be shown on the stereo system display in the same manner as for example, the time of day is now included on many car stereo systems. This feature can be activated either by means of a switch on the front control panel or periodically such as for five seconds each minute. This invention is straight-forward in its design and implementation. The primary components consist of a temperature probe which can be located in any of a number of places on the exterior of the vehicle, an integrated circuit (IC) and some simple interface logic. The probe transmits an electrical signal to the audio unit by means of a thin electrical cable. The electrical signal which is of analog form (a voltage proportional to the temperature for a thermocouple) is sensed by the IC and converted to the equivalent temperature, either in degrees Celsius or Fahrenheit as selected by the user. This IC must first perform an analog-to-digital conversion of the electrical signal and then provide the necessary scaling and compensation to obtain the correct digital representation of the temperature. The IC needed to perform these functions currently exists and is readily available. The digital format signal is then sent to the stereo system's display circuitry. The display device, usually a custom designed LCD, must have the appropriate characters/symbols for showing temperatures—i.e., a symbol for degrees, usually a small superscripted "o" and an "F" and a "C" to indicate the scale displayed. Many current car stereo system displays do not have these characters, hence they must be included in the LCD (or other display technology such as LED) design specification.

If a stereo display unit does not allow for the specific characters/symbols as mentioned above, then the general purpose seven-segment output format could be used. For example, an "F" can be shown by activating the two left vertical segments along with the top and middle horizontal segments. A "C" can be formed using the two left vertical segments with the top and bottom horizontal segments. The degree symbol is formed from the top and middle horizontal segments with the top left and right vertical segments. Refer to FIG. 6, Adding the temperature sensor to a stereo system will require only minor additional logic to interface with the existing display circuitry. There will need to be a selector to specify Centigrade or Fahrenheit along with a way to choose constant, periodic or no display of temperature. This can be done by adding a push button switch that cycles between the functions. Refer to FIG. 6, for a block diagram of the circuity required.

The integrated circuit, IC I contains the functionality to provide the temperature in digital format for display on standard seven-segment output devices (indicated as the line labelled "Data" on FIG. 6. It also has provision for indicating whether either Celsius or Fahrenheit scale is desired by means of an input pin. This is indicated by the line labelled "Function" on FIG. 6. The "Interface Logic" block provides the required functionality to indicate to the display controller (labelled "Microcomputer") what to do with the data. This logic could easily be implemented using "off-the-shelf" random logic or integrated onto a single IC. The functions required include decoding the meaning of the switch closures, sending the Celsius or Fahrenheit signal to IC 1, and interfacing to the display controller.

While the detailed description of the present invention has been shown and described, it is to be understood that these disclosures are for the purpose of illustration and that various changes and modifications may be made without departing from the scope of the invention as set forth in the appending claims.

I claim:

1. A temperature detecting and display device comprising:

an antenna having a metallic signal receiving portion covered with a protective sleeve, said protective sleeve covering the signal receiving portion from its top thereof to at least an area adjacent to its bottom thereof;

an automobile radio having a display, said radio electrically connected to the antenna for receiving a radio signal therefrom;

a temperature sensor positioned between the protective sleeve and the signal receiving portion of the antenna, said temperature sensor electrically connected to the display and configured to sense an ambient temperature signal external to the antenna, said display configured to display outputs corresponding to both said radio signal and said ambient temperature signal.

2. A temperature detecting and display device comprising:

an antenna having a metallic signal receiving portion;

an automobile radio having a display, said radio electrically connected to the antenna for receiving a radio signal therefrom;

a base for connecting the antenna to an automobile, said antenna positioned within a mounting hole in the base;

a temperature sensor positioned within the mounting hole and between the base and the antenna, said temperature sensor electrically connected to the display and configured to sense an ambient temperature signal external to the base, said display configured to display outputs corresponding to both said radio signal and said ambient temperature signal.

* * * * *